United States Patent
Thuo et al.

(10) Patent No.: US 10,266,925 B2
(45) Date of Patent: Apr. 23, 2019

(54) STABLE UNDERCOOLED METALLIC PARTICLES FOR ENGINEERING AT AMBIENT CONDITIONS

(71) Applicant: Iowa State University Research Foundation, Inc., Ames, IA (US)

(72) Inventors: Martin Thuo, Ames, IA (US); Ian D. Tevis, Ames, IA (US)

(73) Assignee: Iowa State University Research Foundation, Inc., Ames, IA (US)

(*) Notice: Subject to any disclaimer, the term of this patent is extended or adjusted under 35 U.S.C. 154(b) by 0 days.

(21) Appl. No.: 14/999,868

(22) Filed: Jul. 12, 2016

(65) Prior Publication Data

US 2017/0014958 A1    Jan. 19, 2017

Related U.S. Application Data

(60) Provisional application No. 62/231,722, filed on Jul. 14, 2015.

(51) Int. Cl.
*B23K 20/00* (2006.01)
*C22C 28/00* (2006.01)
(Continued)

(52) U.S. Cl.
CPC .............. *C22C 28/00* (2013.01); *B22D 27/08* (2013.01); *B22D 27/11* (2013.01); *B22F 1/0062* (2013.01);
(Continued)

(58) Field of Classification Search
CPC ....... B22D 27/08; B22D 27/11; B22F 1/0007; B22F 1/02; B22F 2301/255;
(Continued)

(56) References Cited

U.S. PATENT DOCUMENTS

| 4,042,374 A | 8/1977 | Rasmussen et al. ............. 75/0.5 |
| 4,153,156 A * | 5/1979 | Seemann .............. E21D 20/026 206/219 |

(Continued)

FOREIGN PATENT DOCUMENTS

| WO | WO2015/089309 | 6/2016 |
| WO | WO-2017/011029 A1 | 1/2017 |

OTHER PUBLICATIONS

Michael D,. Dickey,"Emerging Applications of Liquid Metals Featuring Surface Oxides", Applied Materials & Interfaces, 6, 18369-18379, 2014.

(Continued)

*Primary Examiner* — Erin B Saad
*Assistant Examiner* — Carlos J Gamino
(74) *Attorney, Agent, or Firm* — Schwegman Lundberg & Woessner, P.A.

(57) ABSTRACT

Undercooled liquid metallic core-shell particles, whose core is stable against solidification at ambient conditions, i.e. under near ambient temperature and pressure conditions, are used to join or repair metallic non-particulate components. The undercooled-shell particles in the form of nano-size or micro-size particles comprise an undercooled stable liquid metallic core encapsulated inside an outer shell, which can comprise an oxide or other stabilizer shell typically formed in-situ on the undercooled liquid metallic core. The shell is ruptured to release the liquid phase core material to join or repair a component(s).

25 Claims, 9 Drawing Sheets

(51) Int. Cl.
| | |
|---|---|
| B22F 1/02 | (2006.01) |
| B23K 35/02 | (2006.01) |
| B23K 35/26 | (2006.01) |
| B23K 35/30 | (2006.01) |
| B23K 35/36 | (2006.01) |
| B22D 27/11 | (2006.01) |
| B22D 27/08 | (2006.01) |
| B22F 1/00 | (2006.01) |
| B22F 7/06 | (2006.01) |

(52) U.S. Cl.
CPC ............... *B22F 1/02* (2013.01); *B22F 7/064* (2013.01); *B23K 35/0244* (2013.01); *B23K 35/262* (2013.01); *B23K 35/264* (2013.01); *B23K 35/3006* (2013.01); *B23K 35/3013* (2013.01); *B23K 35/3618* (2013.01)

(58) Field of Classification Search
CPC ........ B22F 2301/30; B22F 9/06; B23K 20/16; B23K 35/0244; B23K 35/262; B23K 35/264; B23K 35/3006; B23K 35/3013; B23K 35/3618; C22C 28/00
See application file for complete search history.

(56) References Cited

U.S. PATENT DOCUMENTS

| | | | | |
|---|---|---|---|---|
| 4,273,827 | A * | 6/1981 | Sweeney | B60R 13/02 156/306.6 |
| 4,282,034 | A * | 8/1981 | Smith | B22F 3/006 264/11 |
| 4,514,125 | A * | 4/1985 | Stol | F16B 13/143 156/294 |
| 4,519,866 | A * | 5/1985 | Stol | C09J 5/00 156/250 |
| 4,913,263 | A * | 4/1990 | Spiers | B62D 53/0885 184/105.1 |
| 5,769,308 | A | 6/1998 | Kokusho et al. | 228/200 |
| 6,106,739 | A | 8/2000 | Stephens et al. | 252/62.3 |
| 10,124,310 | B2 * | 11/2018 | Thuo | B01J 13/22 |
| 2005/0250878 | A1 * | 11/2005 | Moore | B29C 73/22 523/211 |
| 2008/0251164 | A1 | 10/2008 | Lohwongwatana et al. | 148/528 |
| 2010/0216632 | A1 | 8/2010 | Adzic et al. | 502/101 |
| 2012/0067615 | A1 * | 3/2012 | Blaiszik | H01B 1/02 174/110 R |
| 2013/0244037 | A1 * | 9/2013 | Hohman | B82Y 30/00 428/402.2 |
| 2016/0317992 | A1 * | 11/2016 | Thuo | B82Y 40/00 |
| 2017/0120295 | A1 * | 5/2017 | Thuo | B22F 1/0025 |

OTHER PUBLICATIONS

Y. Zhou et al., "From Microjoining to Nanojoining", The Open Science Journal, 3, pp. 32-42, 2011.
Xiaopeng Xi et al., Nanwire Joining Methods, The Open Science, 3, pp. 91-104, 2011.
Gregory S. Ferguson et al., Contact Adhesion of Thin Films on Elastomeric Supports: Cold Welding Under Ambient Conditions Science, vol. 253, No. 5021, pp. 776-778, 1991.
Changsoon Kim et al., "Fabrication of Organo Light-emitting Devices by Low Pressure Cold Welding", Adv. Mater. Sci., 15, No. 6 pp. 541-545, 2003.
Yang Lu et al., Cold Welding of ultrathin gold nanowires, Nature Technology, vol. 5, pp. 218-224, Mar. 2010.
Durgesh et al., "Cold welding: a phenomenon for spontaneous self-healing and shape genesis at the nanoscale", Mater. Horiz., 2, pp. 157-167, 2015.
Simona C. Laza et al., "Selective Cold Welding if Colloidal Gold Nanorods" Part. Syst. Charact., 30, pp. 584-589, 2013.
Z. Sun et al., The application of electron beam welding for the joining of dissimilar metals: an overview, J. of Material Processing Technology, 59, pp. 257-267, 1996.
Erik C. Garnett et al., "Self-limited plasmonic welding of silver nanowire junctions", vol. 11, pp. 241-249, Mar. 2012.
Fan Gao et al., Synthesis, Characterization, and Thermal Properties of Nanoscale Lead-Free Solders on Multisegmented Metal Nanowires, J. Phys. Chem., 113, pp. 9546-9552, 2009.
Yong Peng et al., "Bottom-up Nanoconstruction by the Welding of Individual Metallic Nanoobjects Using Nanoscale Solder", Nano Letters, vol. 9, No. 1, pp. 91-96, 2009.
Hidemi Kato et al., "Surface-activated supercooled liquid brazing", Scripta Materialia, 68, pp. 699-702, 2013.
Debabrata Patra et al., "Fabrication of Conductive Microcapsules via Self-Assembly and Crosslinking of Gold Nanowires at Liquid-Liquid Interfaces", small, 6, No. 13, 1402-1405, 2010.
Fan Gao et al., Effect of surface oxide on the melting behavior of lead-free solder nanowires and nanorods, Applied Surface Science, 258, 7507-7514, 2012.
Katsuaki Suganuma, "Advances in lead-free electronics solder", Current Opinion in Solid State and Material Science, 5, 55-64, 2001.
John P. Koppes et al., "Utilizing the thermodynamic nanoparticle size effects for low temperature Pb-fee solder", Materials Science and Engineering B, 177, 197-204, 2012.
W.H. Qi et al., "Size and shape dependent melting temperature of metallic nanoparticles", Materials Chemistry and Physics 88, 280-284, 2004.
A.M. Mullis et al., "The solidification of undercooled melts via twinned dendritic growth", Materials Science and Engineering A, 375-377, pp. 547-551, 2004.
John H. Perepezko, "Nuclleation in Undercooled Liquids", Materials Science and Engineering, 65, pp. 125-135, 1984.
J.H. Perepezko et al., "Undercooling Behavior of Liquid Metals", Elsevier Publising Co., Inc., pp. 49-62, 1991.
D.M. Herlach, "Containerless Undercooling and Solidification of Pure Metals", Annu. Rev. Mater. Sci., 21, pp. 23-44, 1991.
J.H. Perepezko et al., "Undercooling and solidfication of atomized liquid droplets", Materials Science and Engineering, A326, pp. 144-153, 2002.
G.B Parravicini et al., Extreme undercooling (down to 90K) of liquid metal nanoparticlesAppl. Phys. Lett., 89, 033123, 2006.
Ian D. Tevis et al., "Synthesis of Liquid Core-Shell Particles and Solid Patchy Multicomponent Particles by Shearing Liquids into Complex Particles (SLICE)", Langmuir, 30, pp. 14308-14313, 2014.
Vijay Sivan et al., Liquid Metal Particles, Adv. Funct. Mater., 23, pp. 144-152, 2013.
Michael D. Dickey et al., "Eutectic Gallium-Indium (EGaIn): A Liquid Metal Alloy for the Formation of Stable Structures in Microchannels at Room Temperature", Adv. Funct. Mater., 18, pp. 1097-1104, 2008.
Tanya Hutter et al., "Formation of Spherical and Non-Spherical Eutectic Gallium-Indium Liquid-Metal Microdroplets in Microfluidic Channels at Room Temperature", Adv. Funct. Mater., 22, pp. 2624-2631, 2012.
E. Cadirli et al., "The effect of growth rate on microstructure and microindentaiton hardness in the In—Bi—Sn ternary alloy at low melting point", Journal of Alloys and Compounds, 470, pp. 150-156, 2009.
V.T. Witusiewicz et al., "Thermodynamic re-optimisation of Bi—In—Sn system bsed on new experimental data", Journal of Alloys and Compounds, 428, pp. 1115-1124, 2007.
Ned Bowden et al., "Self-Assembly of Microscale Objects through Lateral Capillary Forces", Langmuir, 17, pp. 1757-1765, 2001.
Ned Bowden et al., "Mesoscale Self-Assembly: Capillary Bonds and Negative Menisci", J. Phys. Chem. B, 104, pp. 2714-2724, 2000.
Ned Bowden, Self-Asembly of Mesoscale Objects into Ordered Two-Dimensional Arrays, Science New Series, vol. 276, No. 5310, pp. 233-235, Apr. 11, 1997.
Ned B. Bowden et al., Molecule-Mimetic Chemistry and Mesoscale Self-Assembly, Acc. Chem. Res., 34, pp. 231-238, 2001.

(56) References Cited

OTHER PUBLICATIONS

Daniel B. Wolfe et al.,Mesoscale Self-Assembly: Capillary Interactions When Positive and Negative Menisic Have Similar Amplitudes, Langmuir, 19, pp. 2206-2214, 2003.
Rustem F. Ismagilov et al.,"Autonomous Movement and Self-Assembly", *Angew. Chem. Int. Ed.,* 41, No. 4, 2002.
Yong Zuo,"Evolution of Microstructure Across Eutectic Sn—Bi Solder Joints Under Simultaneous Thermal Cycling and Current Sensing", Journal of Electronic Materials, vol. 44, No. 1, 2015.
Lu Shen et al."Nanoindentation study on creep resistance of SnBi solder ally with reactive nano-metallic fillers", Materials Science & Engineering, A 561, pp. 232-238, 2013.
Martin Thuo et al.,"Odd-Even Effects in Charge Transport acorss Self-Assembled Monolayers", JACS, pp. 2962-2975, 2011.
Emily A. Weiss et al.,"Si/SiO2-Templated Formation for Ultraflat Metal Surfaces on Glass, Polymer, and Solder Supports: Their Use for Self-Assembled Monolayers", Langmuir, 23, pp. 9686-9694, 2007.
"European Application Serial No. 16824809.4, Response filed Aug. 21, 2018 to Communication Pursuant to Rules 161(2) and 162 EPC dated Feb. 21, 2018", w/ English Claims, 17 pgs.
"International Application Serial No. PCT/US2016/000058, International Preliminary Report on Patentability dated Jan. 25, 2018", 10 pgs.
"International Application Serial No. PCT/US2016/000058, International Search Report dated Oct. 18, 2016", 4 pgs.
"International Application Serial No. PCT/US2016/000058, Written Opinion dated Oct. 18, 2016", 8 pgs.
Holland-Moritz, D, et al., "Short-range order of stable and undercooled liquid titanium", *Materials Science and Engineering A* vol. 449-451, 2007), 42-45.
"European Application U.S. Appl. No. 16824809.4, Partial Supplementary European Search Report mailed 01-04-19", 11 pgs.

\* cited by examiner

STABLE UNDERCOOLED METALLIC PARTICLES FOR ENGINEERING AT AMBIENT CONDITIONS

RELATED APPLICATION

This application claims benefit and priority of provisional application Ser. No. 62/231,722 filed Jul. 14, 2015, the disclosure and drawings of which are incorporated herein by reference.

FIELD OF THE INVENTION

The present invention relates to a method for joining or repairing certain metallic components under ambient conditions using undercooled metallic core-shell particles to form a metallurgical and/or mechanical bond.

BACKGROUND OF THE INVENTION

Multi-dimensional fabrication by joining and/or material healing (repair) is limited, in part, due to inherent scale-based challenges in available tools. Most common defect repair or joining techniques like soldering and welding, are limited to bulk uses and cannot be adopted to smaller sizes especially at the microscale and smaller.

Ability to join, or fuse, materials is ubiquitous to manufacturing in many fields such as; electronics, chemical, energy, medical, aerospace, defense, among others, but has been facing challenges, in part, due to increased interest and advances in miniaturization, coupled with the need for greener processes[1,2]. Nanotechnology, for instance, has grown significantly in the recent past, and produces high performance materials with many desirable properties. There are, however, obstacles to fully actualizing the potential of nanomaterials because of limitations in fabricating complex structures and devices[3]. Recently, there has been efforts for interconnections of nanomaterials by welding (e.g. cold welding[4], fusion welding[5], plasmonic welding[6]), soldering (e.g. liquid-phase reflow soldering[7], resistance soldering[8]), brazing[9] and others processes[10] that heavily rely on in situ manipulation, directed assembly, and, self-assembly. The techniques, however, suffer from low efficiency, high costs, and often need specialized samples (e.g. contamination-free, flat surface, and, high purity depending on the technique), as such, they are far from adoption in large scale manufacturing. Similarly, for microsystems, joining is anticipated to be a significant hurdle in their adoption in large-scale manufacturing and fabrication.[1, 11]

In addition to miniaturization issues, the joining industry has been facing two other challenges, viz; (1) Despite the well-established lead-bearing solders that have been used extensively in the assembly of modern electronic devices, limitations of lead use due to environmental and health concerns has triggered research on alternative lead-free solders. Lead-free solders, however, often require higher processing temperatures than lead-containing solders (>450 K) which limits their use and increases cost. (2) Developing flexible electronics, polymer based substrates, electronic devices, and, temperature sensitive components (such as LEDs) require creating joints at low processing temperatures[12, 13]. Also, demand for less energy consuming or more energy efficient processes has been increasing. Therefore, practical energy efficient joining and manufacturing techniques, with low processing temperature, enabling fabrication of complex structure at the micro and smaller size scales is essential for future developments in device manufacturing. It has previously been suggested that metal nanoparticles can be used as a solder material since the melting temperature decreases with reduction in particle size.[13, 14]

Undercooling of metals (i.e. cooling of a liquid metal or alloy below its freezing point without it becoming solid, also known as "supercooling") has been widely studied, primarily to inform metal processing and microstructure evolution during solidification.[15, 16] Due to the metastable nature of undercooled metals, their production in good yields is an experimental challenge. This challenge can be overcome through; i) elimination of heterogeneous nucleating sites, or other sites with high catalytic potency for solidification, and, ii) minimizing the container effects by employing the droplet dispersion or containerless techniques in synthesis of undercooled particles.[17, 18] Using these techniques, undercooling values as high as about 0.3-0.4 $T_m$ have been reported.[16, 19] One of the highest undercooling achieved so far is 0.7 $T_m$ for 3-15 nm gallium particles.[20] The literature on undercooling, however, is heavily skewed towards studies on understanding the solidification behavior and thermodynamics of metal systems.

There is limited discussion on practical applications except for heat transfer[21] and production of metastable solids.[17] One of the reasons for lack of practical use could be the challenges in preparing stable undercooled particles in high yields and at any size scale especially where large undercooling values are desired. In the container-less drop tube technique, for example, the particle is undercooled during free fall. Droplet emulsion techniques, on the other hand, allow for the production of more than one particle at once only if the carrier liquid can maintain a thin, inert surface coating inhibit crystallization, however, stability is still a major concern.

A so-called Shearing Liquids Into Complex ParticlEs process (known as the SLICE technique)[13] involves use of a rotating implement to shear a liquid metal, that is liquid at room temperature, into smaller pieces in an acid containing carrier fluid as illustrated schematically in FIG. 1. Under SLICE, the liquid metal is sheared to the desired size with concomitant surface oxidation to give a passivating layer on which an organic layer is assembled to give smooth surfaces, which is a key component in efficient particle assembly.

The SLICE process is described in PCT/US14/69802 filed Dec. 11, 2014, and a related technique has been reported in U.S. Pat. No. 4,042,374 issued Aug. 16, 1977

SUMMARY OF THE INVENTION

The present invention involves using undercooled metallic core-shell particles whose undercooled core is stable against solidification at ambient conditions, i.e. under ambient temperature and pressure conditions, in the joining or repairing of metallic non-particulate components (i.e. components that do not have a particle shape). The undercooled core-shell particles in the form of nano-size or micro-size particles comprise a undercooled stable liquid metallic core encapsulated inside an outer shell, which can comprise an oxide or other stabilizer shell typically formed in-situ on the undercooled liquid metallic core. The particles preferably can be stabilized in the meta-stable state using self-passivating oxide layer with a stabilizing organic or inorganic adlayer to form a core-shell particle structure.

In an illustrative embodiment of the present invention for joining under ambient conditions, the undercooled core-shell particles are assembled in a manner to join non-particulate metallic components and then the outer shells of the undercooled core-shell particles is ruptured to release the undercooled liquid metallic material of the cores to contact the components and solidify to produce a metallurgical joint between the components. For purposes of further illustration and not limitation, the component can include a metallic film or other material such as a polymer, ceramic, crystals, glass, inorganic material, or a composite material.

In another illustrative embodiment of the present invention for repairing a defect of a non-particulate component, such as a surface crack, pit, depression, or other defect of a sheet or film, under ambient conditions, the undercooled core-shell particles are assembled in a manner to fill the defect and then the outer shells of the undercooled core-shell particles is ruptured to release the undercooled liquid metallic material of the cores to fill the defect and solidify therein.

In practicing these and other embodiment of the present invention, micro-machining, and/or fracturing through mechanical stressing, and selective chemical etching of the outer shells of the particles initiates a cascade of metallic liquid flow from the particle cores to provide alloying and solidification. If the shell is ruptured using mechanical stress, there is a concomitant deformation of the shells providing a combination/alloying, shaping, and, solidification.

This facile and low cost method pursuant to embodiments of the present invention, designated as SUPER (Stable Undercooled Particles for Engineering at Room temperature), enables joining or surface repair of components such as metallic films, wires, electrical connection elements, that are not particles in shape at ambient conditions without heating, skilled manpower, high tech instrumentations, or, complicated sample preparation procedures, or the need for surface cleaning (flux) reagents.

The present invention envisions a liquid metallic coreshell particle having an undercooled liquid metallic core comprising a metal or alloy having a melting point in the range of 62° C. to 900° C., such as 62° C. to 250° C., an outer stabilizer shell on the undercooled liquid metallic core, and an inorganic or organic adlayer on the shell. The liquid metallic core can comprise a solder alloy, such as a Bi-based solder, a Sn-based solder, and other solder alloys having a melting point in the range of 62° C. to 250° C.

These and other advantages of the present invention will become more readily apparent from the following detailed description taken with the following drawings.

BRIEF DESCRIPTION OF THE DRAWINGS

FIG. 3A is a schematic diagram of an illustrative embodiment of the invention of method steps for repairing a defect of a metallic (e.g. silver) film or sheet wherein FIG. 3A illustrates experimental procedure for healing a damaged silver surface. Undercooled particles were placed on a damaged area, sheared using glass cylinder, then template stripped to obtain a flat surface.

FIGS. 4A and 4B illustrate application of SUPER for joining where

DETAILED DESCRIPTION OF THE INVENTION

The present invention involves a method using undercooled metallic core-shell particles whose undercooled liquid core is stable against solidification at ambient conditions, i.e. under ambient temperature and pressure conditions, in the joining or repairing of metallic and/or non-metallic material components such as films, wires, and particles of regular or irregular shapes. The undercooled core-shell particles in the form of nano-size or micro-size particles comprise a stabilized undercooled liquid metallic core encapsulated inside an outer shell, which can comprise of an oxide or other stabilizer shell(s) or layer(s) typically formed on the undercooled liquid metallic core. Undercooled particles in the size range of 4 nm to 900 μm can be used in practice of the invention for purposes of illustration and not limitation. The outer shell may be functionalized with an organic or inorganic moiety to facilitate self-assembly as needed for a particular application.

The liquid metal or alloy of the core is encapsulated as an undercooled (supercooled) stable nano-particle and/or micro-particle, then used as a low temperature joining or repairing material, such as a solder, filler, etc. The use of undercooled metals significantly below their melting point, $T_m$, eliminates many drawbacks of currently available joining or repairing techniques. The liquid metallic material of the undercooled particle cores can have a melting point $T_m$ in the range of 26 to 900° C. By using metals or alloys with low melting temperatures in their undercooled state; e.g. a $T_m$ less than 250 degrees C., then joining or repairing can be performed in ambient temperature and pressure. A joint produced by practice of the method can include shell fragments in a metallic matrix comprising the metallic material of the cores and products of any stabilizing functionalizing organic or inorganic moiety or layer of the shells.

Figure 1A:
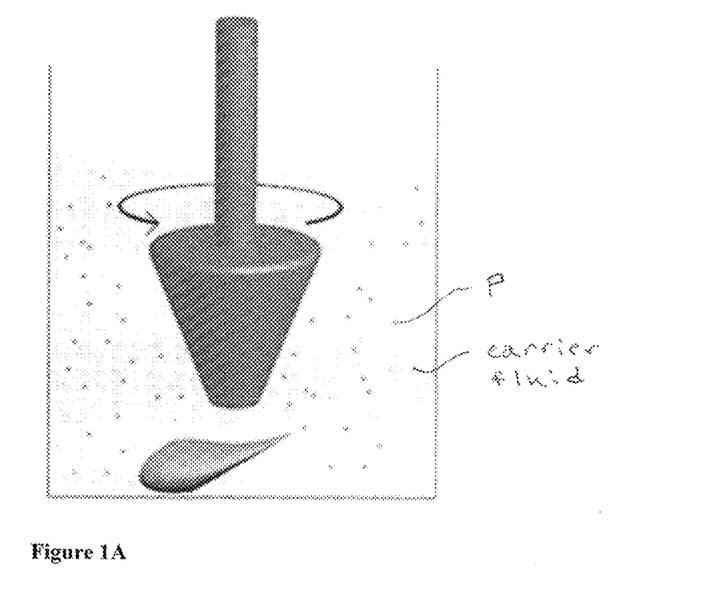
FIG. 1A is a schematic of the SLICE process, where a rotating implement shears the liquid or molten metal into smaller pieces in an acid containing carrier fluid.
Figure 1B:
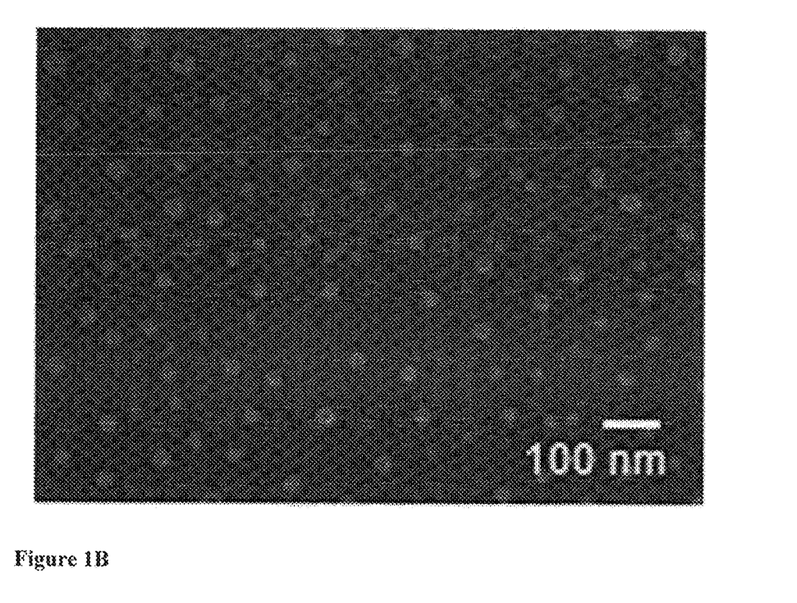
FIG. 1B is a SEM micrograph of nanoparticles derived from the SLICE process.
Figure 1C:
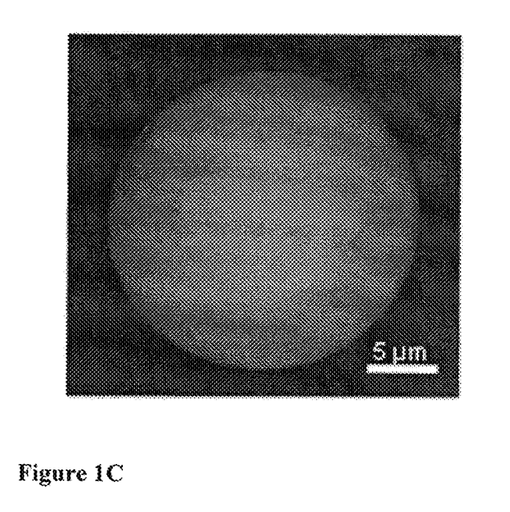
FIG. 1C is an SEM image of an undercooled microparticle.
Figure 1D:
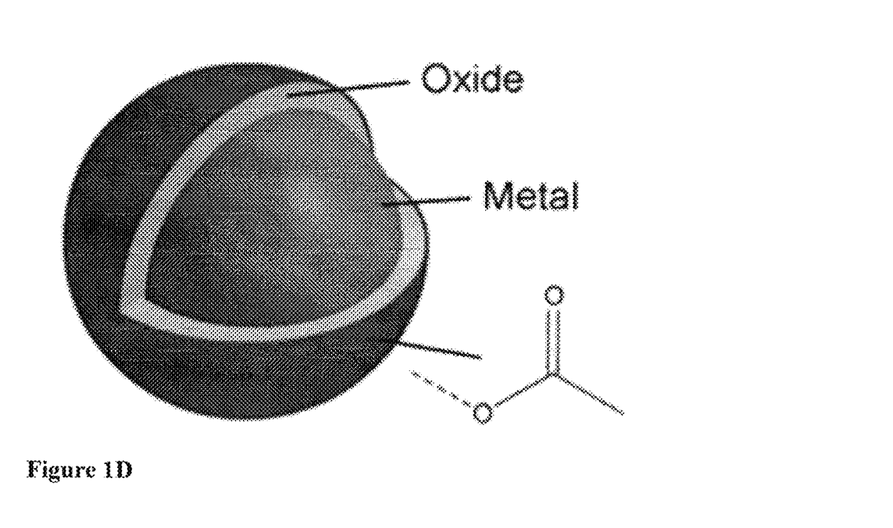
FIG. 1D is a schematic of partial cross-section of a particle having an outer oxide or stabilizer shells or layers encapsulating a liquid metallic core.

The undercooled metallic core-shell particles preferably are made by the aforementioned SLICE process, FIG. 1A, which is an extension of droplet emulsion technique (DET), although the present invention can be practiced with liquid metallic nano-particles or micro-particles made by any other technique. The SLICE process involves shearing a low $T_m$ molten metal or alloy in the presence of a carrier fluid as shown in FIG. 1A together with chemical reaction to produce liquid metallic core-shell nano-particles or micro-particles P, FIGS. 1A, 1B, 1C, and 1D. The chemical reaction typically involves oxidation of the molten metal or alloy in a manner to form the outer shell in-situ on the liquid metallic core. Moreover, the outer shell can be functionalized with an organic moiety, such as acetate or phosphate, to facilitate self-assembly as needed for a particular application, FIG. 1D. The present invention thus envisions a method to prepare stabilized undercooled particles in high yields by shearing liquids metals into a desired sizes and stabilizing the meta-stable state using self-passivating oxide layer with a stabilizing organic or inorganic adlayer to form a core-shell particle structure.

Figures 2A, 2B:
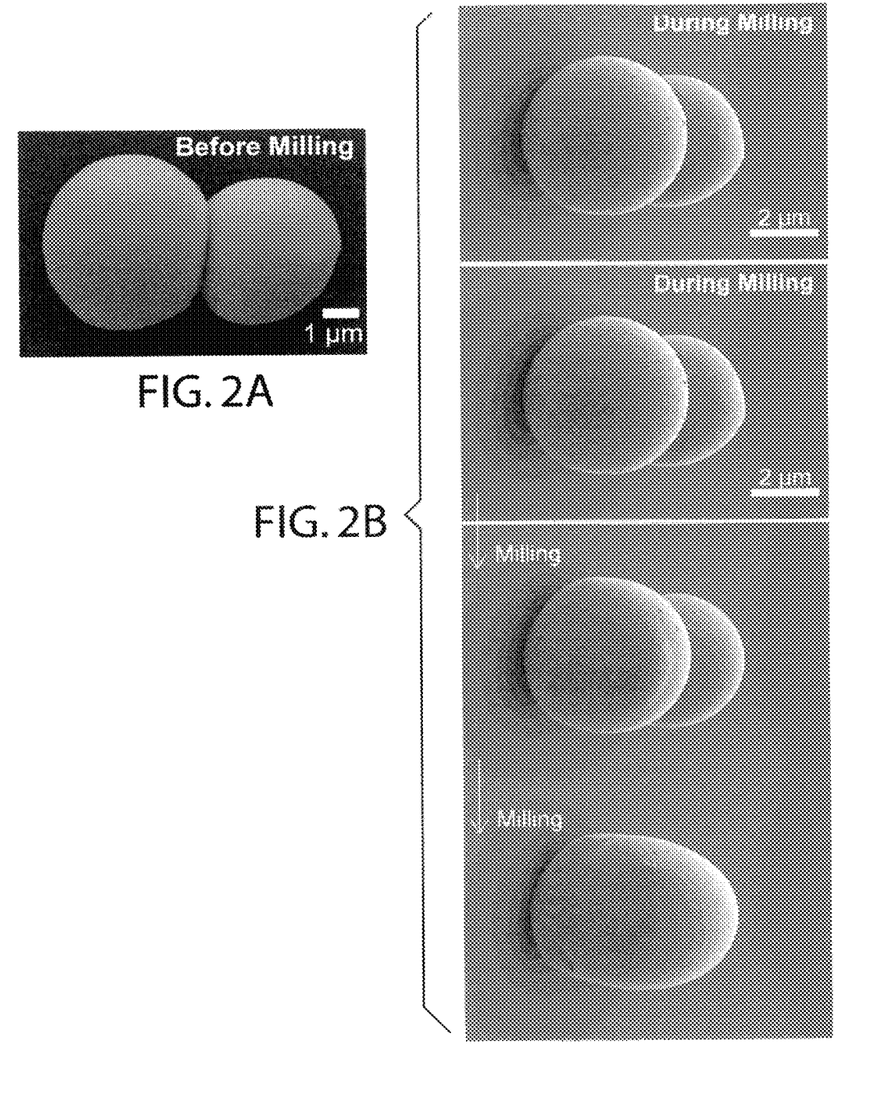
FIG. 2A is an SEM image of undercooled Field's metal microparticles.
FIG. 2B are SEM images of two assembled undercooled metal particles coalescing upon milling to form one large particle.
Figure 2C:
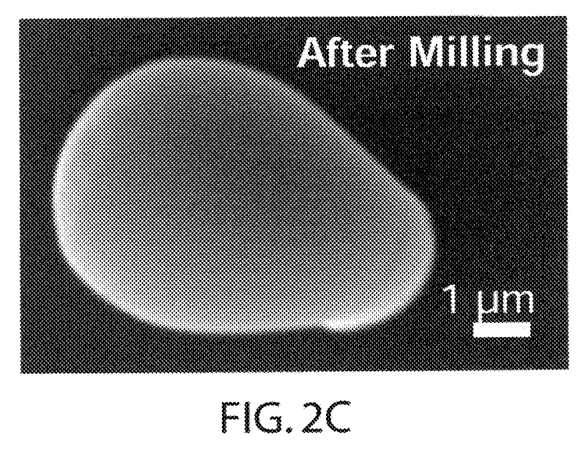
FIG. 2C is an SEM image of the uniform-composition particles after milling.
Figure 2D:
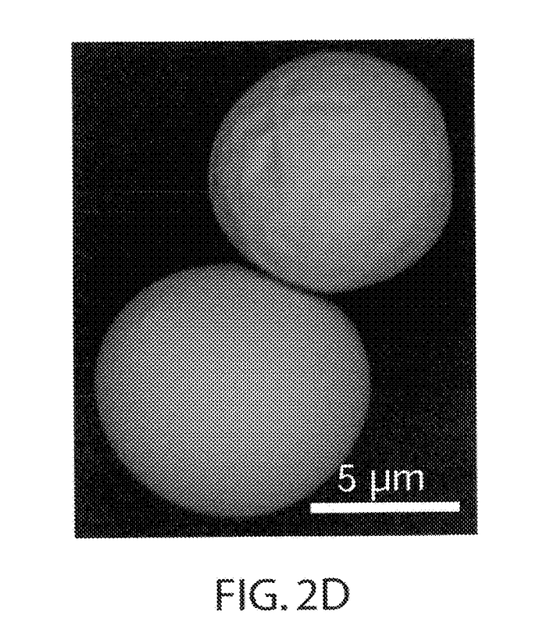
FIG. 2D shows the contrast between SEM images of an undercooled metal particle (bottom particle) and a solidified one not pursuant to the invention (top particle).

For purposes of illustration and not limitation, subjecting Field's metal melt (or other metal or alloy) to SLICE in the presence of the dilute (about 2%) acetic acid in diethylene glycol as described below leads to production of copious amounts of particles, bearing different surface architectures wherein a majority of the particles have a smooth surface texture, FIG. 2A, evidencing production of desired undercooled liquid metallic core-shell particles with a few particles showing phase-segregation. FIG. 2A shows two such desired undercooled liquid metallic core-shell particles with homogenous chemistry. FIG. 2B shows SEM's of the particles in stages during milling. FIG. 2C shows the particles after milling. Associated EDS elemental maps (not shown) of Bi, In, and Sn of the particles demonstrate that the particle is homogenous in elemental composition. FIG. 2D shows the contrast between SEM images of an undercooled metal particle pursuant to the invention (bottom particle) and a solidified one (top particle). Elemental EDS maps (not shown) demonstrated that there is phase-segregation upon solidification of the eutectic particle (top particle), but no phase segregation occurs for the undercooled particle (bottom particle), also demonstrating homogeneously distributed constituent elements (i.e. bismuth, indium and tin) and indicating that the encapsulated undercooled material particle is composed of one phase. An inherent advantage of SLICE is that the size and polydispersity of the generated spherical particles can be controlled through felicitous choice of the synthesis conditions.

Field's metal solidifies into different combination of phases (possible phases include: β, γ, BiIn$_2$ and/or quenched liquid) depending on the solidification conditions[24],[25]. Thermodynamics and microstructures of the eutectic Bi—In—Sn alloys have been discussed in detail by Witusiewicz et al.[25] and Ç adirli et al.[24], which are incorporated herein by reference to this end. The surface texture and phase segregation phenomena of Field's metal can be used to distinguish solidified particles from the desired undercooled liquid metallic core-shell particles. It has previously been shown that undesired solidification of the melt leads to surface phase segregation and subsequent roughening of the metal surface.[22] Undesirable solidified particles can be identified and confirmed by EDS by characteristic contrast in grey scale due to phase-segregation and by their rough surface due to volume changes during solidification. In contrast, undercooled are characterized by a smooth uniform surface texture and homogeneous distribution of elemental constituents particles.

Removal of the outer layers of the nanoparticles by for example milling with FIB (focused ion beam) leads to flow and coalescence of the undercooled liquid cores of the particles, demonstrating that the core-content is a liquid. Having this liquid phase of Field's metal ($T_m$=62° C.) at room temperature shows that the metal is undercooled. Homogeneous distribution of constituent elements in the alloy, even after coalescence under high vacuum indicates that solidification is prevented probably due to lack of a nucleation points or solidification catalysts to help generate nucleation sites on the surface, although the inventors do wish to be bound by any theory in this regard.

The desired undercooled liquid metallic core-shell particles can be suspended in a fluid, such as ethanol, and moved without specific precaution and stored for days at a time as evidenced by the sample preparation steps (centrifugation, filtering, vortex mixing) prior to SEM imaging described below in connection with the Examples. Thus, it can be inferred that the desired undercooled liquid metallic core-shell particles are fairly stable and amenable to workflow and moving stresses. Even direct contact with a rough surface does not induce crystallization, mainly because the outer organic layer (attached on the oxide, e.g. FIG. 1D) isolates the undercooled liquid from contact with the rough surfaces that are potential nucleation points. Stability of these undercooled particles gives an opportunity to manipulate. Moreover, since the solidification is possible at room temperature once the outer layer is removed, these particles can be used for joining and repairing of nano- and micron-size systems at ambient conditions as demonstrated in the Examples below In practice of embodiments of the present invention, the undercooled, liquid metallic core-shell particles are used as a joining platform or repairing platform at ambient conditions wherein the outer shells are ruptured by gentle micro-machining (e.g. focused ion milling), fracturing through mechanical stressing, and/or selective chemical etching to initiate a cascade entailing liquid metal flow from the cores with concomitant deformation, combination/alloying, shaping, and, solidification. If the shell is ruptured using mechanical stress, there is a concomitant deformation of the shells providing a combination/alloying, shaping, and, solidification.

Illustrative examples of shell rupture include, but are not limited to, (i) fracturing of the outer shells by focused ion beam (FIB) milling; (ii), mechanically stressing the particles resulting in fracture of outer shells; and (iii) chemical etching a region of the outer particle shells using an appropriate acid. Rupture of the outer shells or layers leads to flow and subsequent coalescence of the undercooled liquid metal or alloy of the core. Instantaneous solidification occurs due to the numerous in situ generated nucleation sites, in part, due to; i) oxide fragments, ii) contact with substrate surface walls, iii) rapid oxidation in air, and, iv) equilibration to ambient conditions.

In an illustrative embodiment of the present invention for joining in air under ambient conditions using SUPER, the method involves assembling the undercooled core-shell particles in a manner to join non-particulate metallic components and then rupturing the outer shells of the undercooled-shell particles to release the undercooled liquid metallic material of the cores to contact the components and solidify to produce a mechanical and/or metallurgical joint between the components. For purposes of further illustration and not limitation, referring to FIG. 4A, the undercooled particles are assembled as a particle layer between first and second thin sheets of a metal or alloy (e.g. Au backed by Al in the figure) to form a sandwich-type preform and then a normal stress (stress applied orthogonal to the plane of the sheets) is applied to the sandwich-type preform to fracture the outer particle shells to release the liquid metallic core material for solidification between the sheets to join them together. The metal or alloy comprising the liquid metallic core typically alloys or amalgams with the material comprising the sheets to be joined to form a metallurgical bond. Mechanical bonding, upon breakage of the protective shell and solidification, can also be formed to facilitate joining where chemical bonds are not possible. Joining of such sheet-like laminates by rupture of the particle shell followed by coalescence and solidification of the released undercooled liquid from the particle cores is referred herein to as "lava flow soldering" (LFS). When the particles are subjected to mechanical stress to rupture the particles, a joint produced by LFS.

The thin metal sheets or films comprise a metal or alloy that may or may not be chemically different from that of the metal or alloy of the particle cores. For example, gold thin films can be joined by Field's metal released, coalesced and solidified therebetween as described in the Examples below. Sheets having a thickness of 200 nm can be joined in this manner for purposes of illustration and not limitation.

Figure 3A:
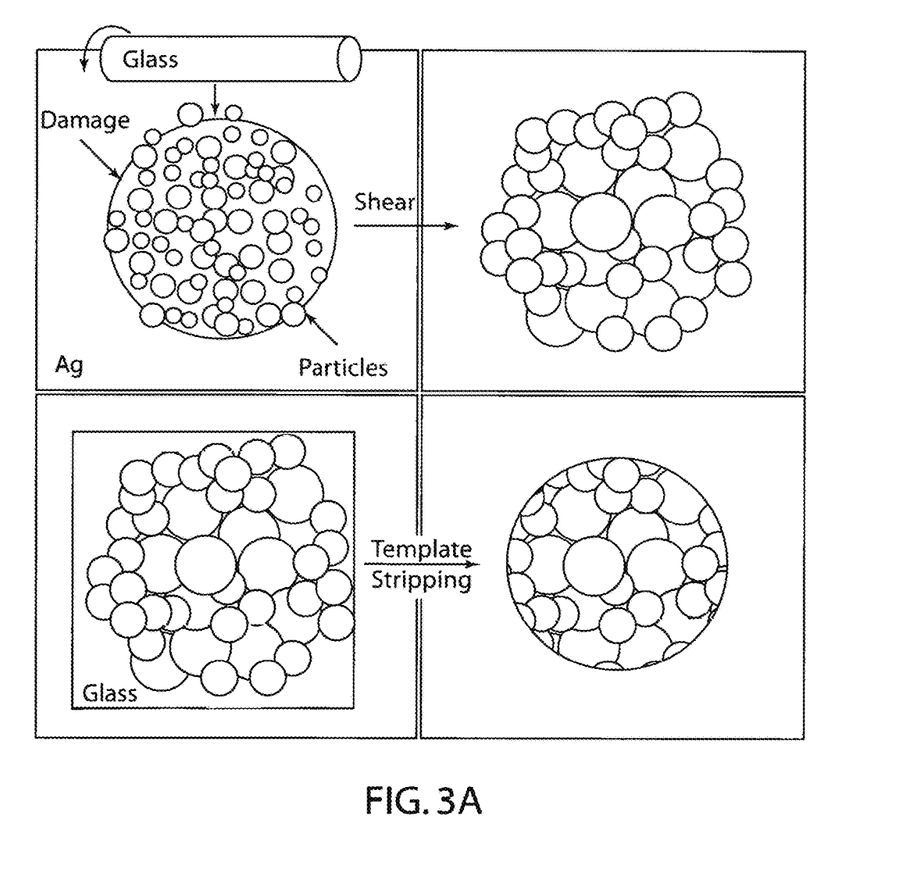

In another illustrative embodiment of the present invention for repairing a defect of a non-particulate component that penetrates to the component surface (e.g. a crack, pit, etc.) using SUPER, the undercooled core-shell particles "Particles" are assembled in a manner to at least partially fill the defect designated "Damage" as illustrated schematically in FIG. 3A where the defect is shown in a Ag film or layer on a Si substrate. Then, the outer shells of the undercooled particles are ruptured by shearing, for example, by rolling the glass pipette rod shown over the particles, to release the undercooled liquid metallic material of the cores to fill the defect and solidify therein, all in air under ambient conditions of temperature and pressure. When the particles are subjected to mechanical stress to rupture the particles, a repaired region is produced by LFS. A glass piece can be placed over the repair to separate the repaired Ag film by template stripping as described in the REPAIRING example below.

In the above illustrative embodiments, the undercooled core-shell particles can be used to trap or agglomerate particulates larger or smaller in size than they are.

The following Examples are offered to further illustrate practice of the present invention, but not limit the scope of the invention.

EXAMPLES

Materials Used:

Eutectic compositions of bismuth-indium-tin (Field's metal, Bi:In:Sn 32.5:51.0:16.5 wt %, m.p.≈62° C., Alfa Aesar, where its freezing point is generally equal to its m.p.) and bismuth-tin (Bi:Sn 58:42 wt %, m.p.≈139° C., Alfa Aesar) were used. For particle preparation, acetic acid (Biotech, sequencing grade), diethylene glycol (BioUltra) and ethanol (200 proof) were purchased from Fisher, Sigma, and Decon Laboratories Inc., respectively.

Particle Preparation:

The SLICE method was followed to form particles with liquid metallic core and oxide-acetate outer layer. An amount [0.6 g (approx.)] of the liquid metallic material was added in acetic acid solution (2 vol % for Field's metal, 1 vol % for Bi—Sn particles) in diethylene glycol. The solution prepared in a glass vial (scintillation vials, 20 mL) were kept in oil bath at determined temperature (120° C. for Field's metal and 160° C. for Bi—Sn) for at least 2 min before subjected to shear to ensure metal melt. Shear was applied using a Dremel 3000 variable speed rotary tool at the rate of 17,000 rpm with extender accessory and cross-shaped (or any other desired geometry) poly(tetrafluoroethylene) (PTFE) shearing implement. Shearing implement was placed as close as possible to vial wall to enhance the effect of shear. After 10 minutes of continuous shearing, heat was withdrawn, and the shear rate was gradually decreased to zero over a period of 1 minute. The suspension was allowed to gradually cool to about 10° C. above the metal's melting point before filtration and washing. Excess acetic acid and diethylene glycol was washed out with ethanol through filtering. Whatman #1 (particle retention of 11 μm), VWR Filter paper 494 (particle retention of 1 μm) and Whatman grade EPM 2000 (particle retention of 0.3 μm) filter papers were used for separation and cleaning of particles. Particles were stored in ethanol.

Focused Ion Beam:

Scanning electron microscopy-Focused Ion Beam (SEM-FIB): Zeiss NVision 40 Dual-Beam SEM-FIB was used to image the formed particles and mill away their surfaces. Imaging was performed at 2 kV with a working distance of 5.1 mm tilted at a 54° angle with a pixel size of 6.602 nm. Images were collected using the In-lens detector. A FIB of gallium ions was used to mill away a rectangular area directly over the formed EGaIn particles using an accelerating voltage of 30 kV and ion current of 1 pA. Milling was performed one frame at a time followed by imaging with the SEM.

Particle Characterization:

In the above Examples, all metal particles were characterized with scanning electron microscopy (FEI Quanta 250 FE-SEM). The SEM were operated under high vacuum at the voltage of 8-10 kV. Both the secondary electron and the energy selective backscattering (EsB) mode were used to image the samples. Chemical characterization were conducted by energy dispersive X-Ray spectroscopy (EDS). Additional characterization was performed on a Zeiss Supra 55VP Field Emission SEM. Samples were imaged using an electron beam accelerating voltage of 3 kV and a working distance of 3.3 mm. Images were collected using an In-lens detector or an Everhart-Thornley secondary electron detector. Elemental analysis was performed at a working distance of 8.5 mm and using electron beam accelerating voltages of 15 kV. Elemental composition was determined using an Energy Dispersive x-ray Spectrometer with a silicon drift detector.

Figure 3B:
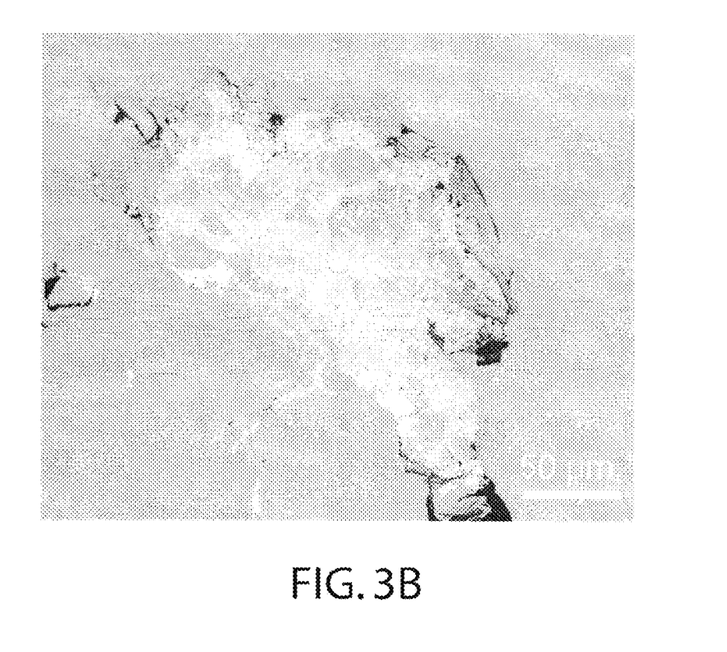
FIG. 3B shows SEM image of a healed silver surface.

Repairing and Joining:

In some examples, these undercooled core-shell particles were used for healing of damaged surface, such as a crack, scratch, or other defect below the microscale when the surface bearing the defect or to be joined can alloy or amalgam with the undercooled metal. This approach can be valuable in repairing delicate thin film materials where high temperature or mechanical force cannot be applied. In other examples, the undercooled core-shell particles were used for joining metals or alloys having chemistry(s) different from the chemistry of the undercooled particles. Selective joining can be realized where the metal or alloy can alloy or amalgam with particle alloy or even non-alloying materials that form weak mechanical contacts Repairing:

A 200 nm thick pure silver (99.99%) films were deposited on silicon wafer using e-beam evaporator (Temescal BJD-1800). Silver layer were damaged to create a ~millimeter-wide defect by cutting off a section of the metallic film. A suspension of SLICE-produced undercooled core-shell particles in ethanol were poured on silver surface to form a mass of particles filling the defect, FIG. 3A, the solvent was allowed to evaporate at ambient conditions, and application of mechanically shear stressed using side of a glass Pasteur pipette after evaporation of ethanol to released the liquid phase core alloy, which alloyed with the Ag film to seal the defect, FIG. 3B. Then, template stripping procedure was applied to remove the healed silver film from the silicon substrate, FIG. 3A. For template stripping, a glass piece was cleaned with ethanol and dried with a stream of nitrogen gas. An estimated 5 μL of optical adhesive (Norland optical adhesive 61) was applied on a glass piece and glued on a substrate. The sample was exposed to UV light to cure an adhesive for 12 hours. The glass stripped off the substrate using a razor blade.

Figure 3C:
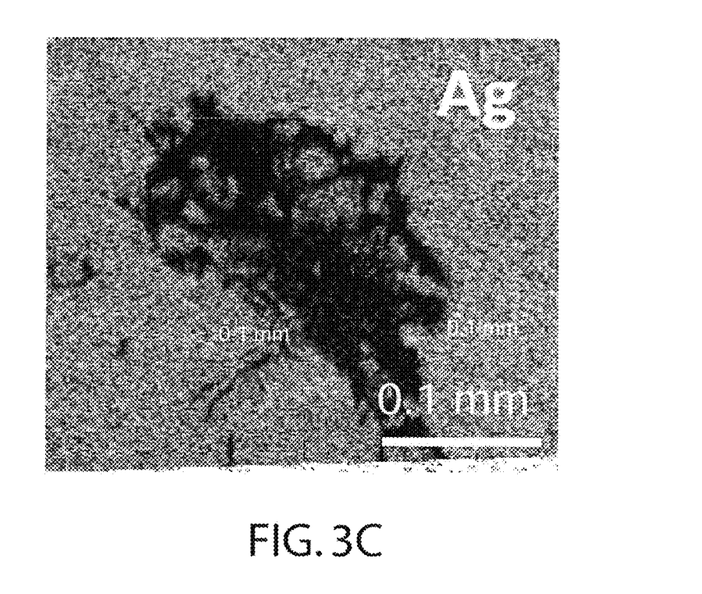
FIG. 3C shows an elemental EDS map of Ag of the healed surface.

Elemental EDS maps of Ag, Bi, In and Sn showed that the Field's metal almost fully recovered the damaged area of the silver sheet. FIG. 3C shows EsB detector image of a healed silver surface and shows elemental EDS map of Ag. This type of joining is designated as 'lava-flow soldering (LFS) [also referred to as "lava-flow welding" (LFW)] since it entails flow and solidification of the undercooled metal. As clearly seen in FIG. 3B, the damaged area is healed with the solidified metal upon mechanical stressing the collection of undercooled particles filling the defect. Compositional distribution of Field's metal constituents, Bi, In, and Sn, was not homogeneous over the area covered, which probably stemmed from the separation of components due to kinetic- and/or thermal-differentiation of the resultant alloy with Ag. More uniform healing could be obtained by separation of bismuth-rich undercooled particles owing to Bi having relatively higher density. In this example, the healing materials were selected to be different in chemistry than the surface to increase the contrast between phases, but better alloying elements can be achieved using undercooled particles from the same metal.

Figure 4A:
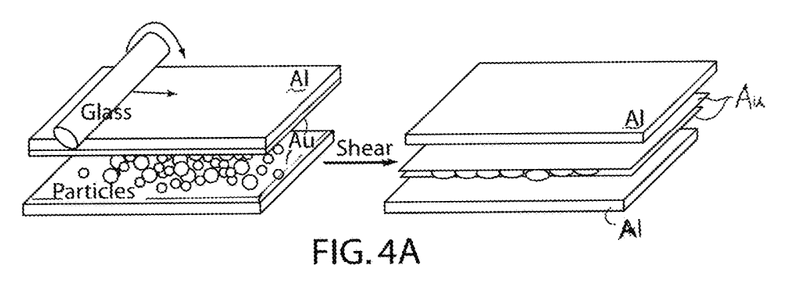
FIG. 4A illustrates the experimental procedure for joining gold films by application of shear stress on undercooled particles sandwiched between aluminum foil leading to joining of the thin gold films with concomitant delaminating from the aluminum foil.
Figure 4B:
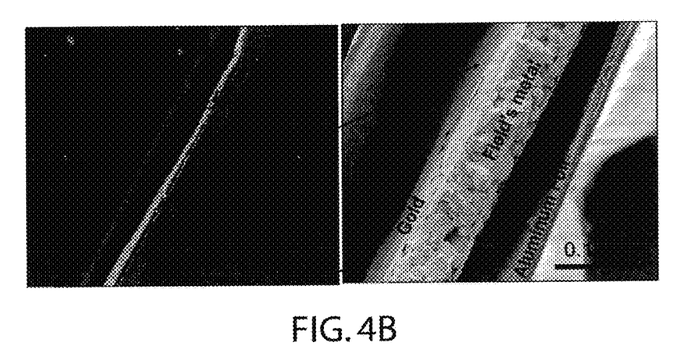
FIG. 4B are the low and high magnification images showing the Field's metal particles joining the gold sheets while delaminating the aluminum foil.

Lava Flow Soldering:

Another example of the application of SUPER is joining of thin Au films (200 nm thick) with concomitant delamination from the substrate (FIGS. 4A and 4B). For this experiment, aluminum foil (Reynolds Wrap) was deposited with a 200 nm thick gold (99.99%) film using the same e-beam evaporator system described above. Undercooled particles were sandwiched in between the foil prior to folding to fold the gold film onto itself. The undercooled core-shell particles in ethanol solution were dropped on the gold foil using a Pasteur pipette. The folded aluminum foil/gold foil was sheared (mechanically stressed) by side of a glass Pasteur pipette to join the two gold surfaces.

As a result, the released liquid Field's metal not only alloyed with and metallurgically joined together the facing Au sheets, FIG. 4B, but also delaminated the joined gold films from the aluminum foil support, indicating a stronger (thermodynamically favorable) interaction with Field's metal. Elemental EDS maps across the joint that show that the distribution of Al, Au, Bi, In, and Sn was in accordance with FIG. 4B.

This example demonstrates that layered lamina material can be step-wise delaminated using this so-called lava flow soldering where undercooled core-shell particles specific to each layer are used. Similarly, using less and/or smaller particles and tuning the applied stress as discussed above, many different joints can be obtained at ambient conditions. A high normal (orthogonal) stress in this example was used to allow for imaging, but rapid application of high shear stress gives the same LFW effect but with a thinner interlayer between the gold films.

The present invention envisions a liquid metallic core-shell particle for use in soldering applications and having an undercooled liquid metallic core comprising a metal or alloy having a melting point in the range of 62° C. to 900° C., such as 62° C. to 250° C., an outer stabilizer shell on the undercooled liquid metallic core, and an inorganic or organic adlayer on the shell. The liquid metallic core can comprise a solder alloy, such as a Bi-based solder such as Field's metal, a Sn-based solder, and other solder alloys having a melting point in the range of 62° C. to 250° C.

Another Example of practice of the present invention involves a method involving embedding or dispersing the above-described undercooled particles in any material such that, upon failure, the particles rupture and the liquid metallic core material flows and solidifies to stop propagation of the defect (e.g. crack) caused by the failure with subsequent healing of the already-formed defect of the material.

Still another Example of practice of the present invention involves a method of preparing composite materials in which the undercooled liquid metallic core-shell particles are used to introduce a metal into a composite material. The particles are ruptured in the material to create and exploit mechanical and/or chemical bonds with the material to produce a composite material. The undercooled core-shell particles can introduce the matrix of the composite material or supply the filler (or co-filler) material. The core-shell particles can be used to create self-repairing composite materials, in which case the particles rupture upon mechanical failure of the composite and upon flow and solidification of the core material stop propagation of a defect (e.g. crack) caused by the failure and heal the defect.

A further embodiment involves using the undercooled particles to trap or agglomerate particulates larger or smaller in size than they are by mixing the undercooled particles and the particulates and then rupturing the shells so that the liquid metallic core is released and traps or agglomerates the particulates as a mass upon solidification.

Still other applications of SUPER are set forth below

Metal Casting or Molding

Figure 6:
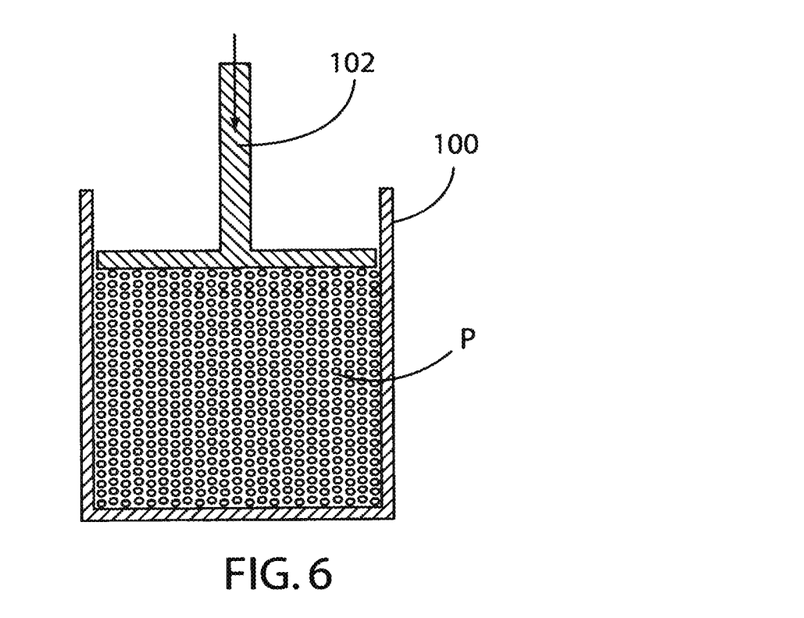
FIG. 6 is a schematic diagram of use of the core-shell particles in a metal casting or molding process.

Another example of the application of SUPER is metal casting or molding wherein the above-described core-shell particles P are placed in a mold 100, FIG. 6. In metal casting, pressure is applied to the particles P in the mold to rupture the outer shell and release the undercooled molten metallic core material to solidify in the mold as a cast body shaped by the inner shape of the mold. Pressure can be applied mechanically to the particles using a piston or plunger 102 moved into the mold 100 to press on the particles or non-mechanically using vibration, ultrasound or other pressure applying technique to rupture the particle shells in the mold.

In metal molding, the above-described core-shell particles are placed in a female part of a mold apparatus, such as mold 100 of FIG. 6. In metal molding, pressure is applied to the particles in the female mold by inserting and moving the male part, such as mold piston or plunger 102 of the molding apparatus, FIG. 6, to rupture the outer shell and release the molten metallic core material to solidify as a molded body.

Additive Manufacturing (e.g. 3D Printing)

Figure 7:
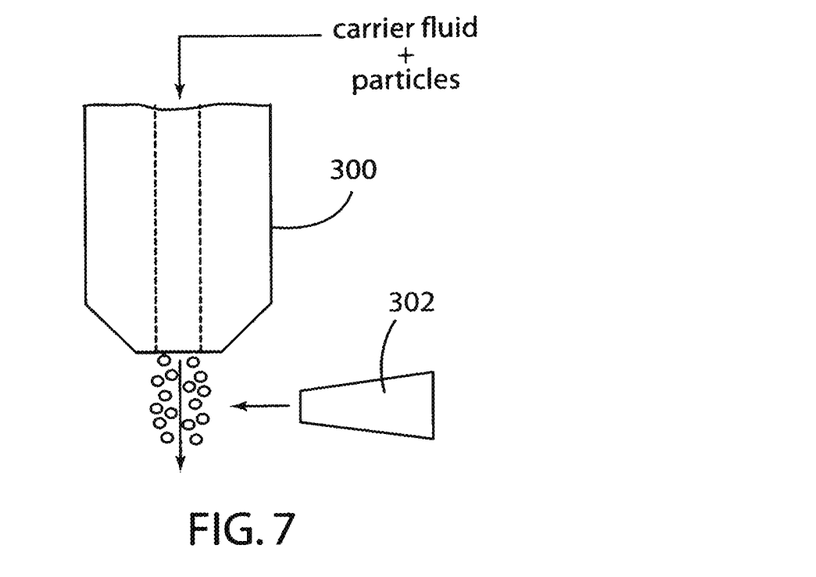
FIG. 7 is a schematic diagram of use of the core-shell particles in an additive manufacturing process, such as 3D printing.

Still another example of the application of SUPER is 3D printing wherein the above-described core-shell particles are disposed in a carrier fluid for discharge from a nozzle 300, FIG. 7. The discharged core-shell particles in the carrier fluid can be immediately stressed as they leave the nozzle 300 in a manner to rupture the particle shell so that the liquid metallic core material is deposited on a substrate. Stress can be applied on the discharged core-shell particles by a pressure change upon discharge from the nozzle or by a laser beam(s) from laser(s) 302 directed at the discharged particles to cleave the outer shell in a manner used in practice of the known laser sintering process or in practice of the so-called laser induced forward transfer (LIFT) process for laser jetting of metal droplets (see Bohandy et al., "Metal deposition from supported metal film using excimer laser", J. Appl. Phys., 60, 1538 (1986) and Mogyorosi et al., Pulsed laser ablative deposition of thin metal films: App. Surf. Sci. 36, 157-163 (1989), the disclosures of which are incorporated herein to this end.

Alternately, the core-shell particles can be discharged from the nozzle 300 without rupturing the outer shells so that the core-shell particles are deposited on substrate where the particle shells are ruptured upon impact with the substrate surface or by subjecting the core-shell particles after deposition to a mechanical or non-mechanical rupturing step to rupture the outer shell and release the molten metal core material to solidify in-situ on the substrate as a printed layer. For example, the outer shells of as-deposited particles can be ruptured by applying a mechanical stress in the thickness direction to the particles on the substrate using suitable pressure-applying means described above or by non-mechanical laser cleaving or ablation of the outer shells.

Figure 5:
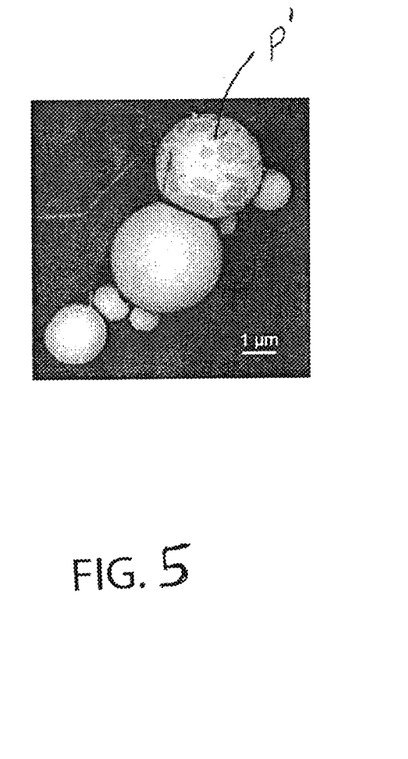
FIG. 5 is an SEM of undercooled Bi—Sn particles pursuant to the invention (lower particles) and phase segregated Bi—Sn eutectic solidified particles P' (topmost large particle) not pursuant to the invention produced as described below.

The above Examples illustrate use of the SUPER technique in which undercooled core-shell particles are used for rapid, heat-free joining, repairing and structure fabrication (casting/3D printing) at ambient conditions such as room temperature. The capability of this technique was demonstrated with respect to defect healing and lava flow soldering. Applications of SUPER, however, are not limited to these specific examples. For example, use of eutectic bismuth-tin alloy particles produced by SLICE can be used as candidate lead-free solders[27] for use in soldering electrical connections, such as wire-to-wire, wire-to-contact pad, and other complex geometries. Even though BiSn at eutectic composition has much higher melting point (m.p.≈139° C.) than Field's metal (m.p.≈62° C.), undercooled particles can be produced, FIG. 5, at high yields, using SLICE as described above in the "Particle preparation" paragraph and employed as a Bi-based solder in soldering such electrical connections in a manner described above for LFW joining. The undercooled particles can be assembled as a mass or mound or as a layer over the electrical connection where the components are to be joined (soldered) and then ruptured there to form the solder joint as described above.

In practicing the above described Examples, it has been found that superheating the alloy during the SLICE process to at least 20 degrees C. above the melting point $T_m$ of the metal or alloy produces beneficial results in terms of suitable undercooled liquid core-shell particles that are stable enough at ambient or room temperature to enable heat-free soldering and repairing as described above. Metals and alloys with higher $T_m$ can be made using embodiments of the invention wherein the SLICE liquid comprises a material such as an ionic liquid [e.g. (BMIM)(PFNFSI) which decomposes at $T_d$ of 290° C. and quaternary ammonium ionic liquids]; or polar hydrocarbon liquid (e.g. polyphenyl ether pump fluid, boiling point $T_b$ approximately 475° C. at 760 mmHg) having a higher melting point that allows the SLICE process to be practiced at the suitable temperature that is 20° C. above the corresponding Tm of the metal or alloy. (BMIM)(PFNFSI) is 1-butyl-3-methylimidazolium N-pentafluorphenylnonelu­orbutylsulfonamide.

Other ionic liquids having appropriate $T_m$'s that can be used below their decomposition temperature ($T_d$) and above their $T_m$ are described in Zhang, Physical Properties of Ionic Liquids: Database and Evaluation, J. Phys. Chem. Ref. Data, Vol. 35, No. 4, 2006, the disclosure of which is incorporated herein by reference, and include but are limited to, [NH$_4$][NO$_3$]; [TMA][BF$_4$]; [TEA][BF$_4$]; [TPA][BF$_4$]; [TBA][BF$_4$] where TMA is tetramethyl ammonium; TEA is tetraethyl ammonium; TPA is tetramyl ammonium; and TBA is tetrabutyl ammonium. Such alloys having a higher $T_m$'s can include, but are not limited to, solder alloys $Sn_{91}Zn_9$ ($T_m$=199° C.); $Sn_{96.5}Ag_{3.5}$ ($T_m$=221° C.); and so-called SAC $Sn_{96.5}Ag_{3.5-4.7}Cu_{0.5-1.7}$ ($T_m$=217° C.) and other Sn-based solders as well as a Ag-based or Ag-containing alloy solder and a Au-containing alloy solder.

Although the present invention has been described with respect to certain illustrative embodiments, those skilled in the art will appreciate is not limited to these embodiments and that changes and modifications can be made therein within the scope of the invention as set forth in the appended claims.

References, which are Incorporated Herein by Reference:

[1] Y. Zhou, A. Hu, The Open Surface Science Journal 2011, 3, 32.

[2] Y. N. Zhou, *Microjoining and Nanojoining*, Elsevier Science, 2008.

[3] X. Qi, T. Nie, H. Xinning, in *Handbook of Manufacturing Engineering and Technology*, (Ed: A. Nee), Springer London, 2014, 1; Xiaopeng Li, Fan Gao, Z. Gu, The Open Surface Science Journal 2011, 3, 91.

[4] G. S. Ferguson, M. K. Chaudhury, G. B. Sigal, G. M. Whitesides, Science 1991, 253, 776; C. Kim, S. R. Forrest, Advanced Materials 2003, 15, 541; Y. Lu, J. Y. Huang, C. Wang, S. Sun, J. Lou, Nat Nano 2010, 5, 218; S. C. Laza, N. Sanson, C. Sicard-Roselli, A. Aghedu, B. Palpant, Particle & Particle Systems Characterization 2013, 30, 584; D. V. Wagle, G. A. Baker, Materials Horizons 2015.

[5] Z. Sun, R. Karppi, Journal of Materials Processing Technology 1996, 59, 257.

[6] E. C. Garnett, W. Cai, J. J. Cha, F. Mahmood, S. T. Connor, M. Greyson Christoforo, Y. Cui, M. D. McGehee, M. L. Brongersma, Nat Mater 2012, 11, 241.

[7] F. Gao, S. Mukherjee, Q. Cui, Z. Gu, The Journal of Physical Chemistry C 2009, 113, 9546.

[8] Y. Peng, T. Cullis, B. Inkson, Nano Letters 2009, 9, 91.

[9] H. Kato, S.-G. Yu, A. D. Setyawan, K. Yubuta, T. Wada, Scripta Materialia 2013, 68, 699.

[10] D. Patra, N. Malvankar, E. Chin, M. Tuominen, Z. Gu, V. M. Rotello, Small 2010, 6, 1402; P. Peng, A. Hu, H. Huang, A. P. Gerlich, B. Zhao, Y. N. Zhou, Journal of Materials Chemistry 2012, 22, 12997.

[11] W. Menz, J. Mohr, O. Paul, in *Microsystem Technology*, Wiley-VCH Verlag GmbH, 2007, 1.

[12] F. Gao, K. Rajathurai, Q. Cui, G. Zhou, I. NkengforAcha, Z. Gu, Applied Surface Science 2012, 258, 7507; K. Suganuma, Current Opinion in Solid State and Materials Science 2001, 5, 55.

[13] J. P. Koppes, K. A. Grossklaus, A. R. Muza, R. R. Revur, S. Sengupta, A. Rae, E. A. Stach, C. A. Handwerker, Materials Science and Engineering: B 2012, 177, 197.

[14] W. H. Qi, M. P. Wang, Materials Chemistry and Physics 2004, 88, 280.

[15] K. I. Dragnevski, A. M. Mullis, R. F. Cochrane, Materials Science and Engineering: A 2004, 375-377, 485; D. Herlach, Metals 2014, 4, 196; J. H. Perepezko, Materials Science and Engineering 1984, 65, 125.

[16] J. H. Perepezko, J. S. Paik, MRS Online Proceedings Library 1981, 8, null.

[17] D. Herlach, D. Holland-Moritz, P. Galenko, *Metastable Solids from Undercooled Melts*, Elsevier Science, 2006.

[18] D. M. Herlach, Annual Review of Materials Science 1991, 21, 23; D. M. Herlach, R. F. Cochrane, I. Egry, H. J. Fecht, A. L. Greer, International Materials Reviews 1993, 38, 273.

[19] J. H. Perepezko, J. L. Sebright, P. G. Höckel, G. Wilde, Materials Science and Engineering: A 2002, 326, 144.

[20] G. B. Parravicini, A. Stella, P. Ghigna, G. Spinolo, A. Migliori, F. Dacapito, R. Kofman, Applied Physics Letters 2006, 89, 033123.

[21] J. Perepezko, D. Rasmussen, C. Loper, Google Patents, 1982.

[22] I. D. Tevis, L. B. Newcomb, M. Thuo, Langmuir 2014, 30, 14308.

[23] M. D. Dickey, R. C. Chiechi, R. J. Larsen, E. A. Weiss, D. A. Weitz, G. M. Whitesides, Advanced Functional Materials 2008, 18, 1097; T. Huffer, W.-A. C. Bauer, S. R. Elliott, W. T. S. Huck, Advanced Functional Materials 2012, 22, 2624; V. Sivan, S.-Y. Tang, A. P. O'Mullane, P. Petersen, N. Eshtiaghi, K. Kalantar-zadeh, A. Mitchell, Advanced Functional Materials 2013, 23, 144.

[24] E. Çadirli, U. Böyük, H. Kaya, N. Maraşli, K. Keşlioğlu, S. Akbulut, Y. Ocak, Journal of Alloys and Compounds 2009, 470, 150.

[25] V. T. Witusiewicz, U. Hecht, B. Böttger, S. Rex, Journal of Alloys and Compounds 2007, 428, 115.

[26] N. Bowden, F. Arias, T. Deng, G. M. Whitesides, Langmuir 2001, 17, 1757; N. Bowden, S. R. J. Oliver, G. M. Whitesides, Journal of Physical Chemistry B 2000, 104, 2714; N. Bowden, A. Terfort, J. Carbeck, G. M. Whitesides, Science (Washington, D.C.) 1997, 276, 233; N. Bowden, J. Tien, W. T. S. Huck, G. M. Whitesides, Supramolecular Organization and Materials Design 2002, 103; N. B. Bowden, M. Weck, I. S. Choi, G. M. Whitesides, Accounts of Chemical Research 2001, 34, 231; L. Isaacs, D. N. Chin, N. Bowden, Y. Xia, G. M. Whitesides, Perspectives in Supramolecular Chemistry 1999, 4, 1; R. F. Ismagilov, A. Schwartz, N. Bowden, G. M. Whitesides, Angewandte Chemie, International Edition 2002, 41, 652; D. B. Wolfe, A. Snead, C. Mao, N. B. Bowden, G. M. Whitesides, Langmuir 2003, 19, 2206.

[27] Y. Zuo, L. Ma, S. Liu, Y. Shu, F. Guo, Journal of Elec Materi 2015, 44, 597; L. Shen, Z. Y. Tan, Z. Chen, Materials Science and Engineering: A 2013, 561, 232; L. Felton, C. Raeder, D. Knorr, JOM 1993, 45, 28.

[28] M. M. Thuo, W. F. Reus, C. A. Nijhuis, J. R. Barber, C. Kim, M. D. Schulz, G. M. Whitesides, Journal of the American Chemical Society 2011, 133, 2962; E. A. Weiss, G. K. Kaufman, J. K. Kriebel, Z. Li, R. Schalek, G. M. Whitesides, Langmuir 2007, 23, 9686.

We claim:

1. A method of joining, comprising:
rupturing an outer shell of one or more undercooled liquid metallic core-shell particles under ambient conditions, each core-shell particle having an undercooled liquid metallic core material contained within the outer shell to release the undercooled liquid metallic core material; and
solidifying the released undercooled liquid metallic core material under ambient conditions to join components that comprise at least one of a metallic material and a non-metallic material.

2. The method of claim 1 wherein the undercooled liquid metallic core material has a melting point $T_m$ in the range of 26 to 900° C.

3. The method of claim 1 wherein a chemistry of the components is the same as or different from a chemistry of the undercooled liquid metallic core material.

4. The method of claim 1 wherein said components comprise non-particulate material.

5. The method of claim 1 wherein said components comprise particulates.

6. The method of claim 5 wherein the particulates comprise other said undercooled liquid metallic core-shell particles.

7. The method of claim 5 wherein the particulates are placed in a mold or a container and outer shells of said particulates then are ruptured to form a molded or cast body in the mold or container.

8. The method of claim 1 wherein said one or more undercooled liquid metallic core-shell particles is/are assembled between the components to be joined and the outer shell of the one or more undercooled liquid metallic core-shell particles is/are ruptured.

9. The method of claim 1 wherein said one or more undercooled liquid metallic core-shell particles is/are assembled on electrical components to be joined and the outer shell of the one or more undercooled liquid metallic core-shell particles is/are ruptured to join the electrical components.

10. The method of claim 9 wherein the electrical components are electrical wires, contact pads, or a wire-to-contact pad.

11. The method of claim 1 wherein said undercooled liquid metallic core-shell particles are ruptured after being discharged from a nozzle.

12. The method of claim 11 wherein said nozzle is an additive manufacturing printer nozzle.

13. The method of claim 11 wherein the outer shell of the one or more undercooled liquid metallic core-shell particles is/are ruptured in flight to a substrate or after deposition on the substrate.

14. The method of claim 1 wherein the outer shell of the one or more undercooled liquid metallic core-shell particles is/are ruptured by machining, by applying a mechanical stress, or by chemical etching using an etching reagent.

15. The method of claim 1 wherein the one or more components comprises a metallic film, metallic wire, metallic particle, metallic contact, polymer, ceramic, crystals, glass, inorganic material, or a composite material.

16. The method of claim 1 wherein the outer shell of the one or more undercooled liquid metallic core-shell particles is stabilized by an organic or inorganic stabilizing adlayer.

17. The method of claim 1 wherein the liquid metallic core material comprises a solder alloy.

18. The method of claim 1 wherein the metallic material comprises at least one of gold and silver.

19. The method of claim 16 wherein the outer shell comprises an oxide and the adlayer comprises acetate.

20. The method of claim 1 wherein the undercooled liquid metallic core material has a melting point range of 62° C. to 250° C.

21. The method of claim 1 wherein the undercooled liquid metallic core material comprises a Bi-based solder.

22. The method of claim 1 wherein the undercooled liquid metallic core material comprises a Sn-based solder.

23. The method of claim 1 wherein the undercooled liquid metallic core metal comprises Field's metal.

24. The method of claim 1 wherein the ambient temperature is room temperature.

25. The method of claim 2, wherein the outer shell of the one or more undercooled liquid metallic core-shell particles is/are ruptured by chemical etching using an etching reagent.

* * * * *